US012232679B2

(12) United States Patent
Wolowicz et al.

(10) Patent No.: US 12,232,679 B2
(45) Date of Patent: *Feb. 25, 2025

(54) DISHWASHER WITH DRAIN ASSEMBLY (71) Applicant: Whirlpool Corporation, Benton Harbor, MI (US)

(72) Inventors: Mateusz Michal Wolowicz, Wroclaw (PL); Pawel Krzysztof Kolodziej, Wroclaw (PL); Radoslaw Pawel Jonczyk, Wroclaw (PL)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,270

(22) Filed: Jan. 10, 2024

(65) Prior Publication Data
US 2024/0148220 A1    May 9, 2024

Related U.S. Application Data (63) Continuation of application No. 17/493,952, filed on Oct. 5, 2021, now Pat. No. 11,882,978.

(51) Int. Cl.
A47L 15/42    (2006.01)
F16L 3/26    (2006.01)

(52) U.S. Cl.
CPC ....... A47L 15/4223 (2013.01); A47L 15/4246 (2013.01); F16L 3/26 (2013.01); A47L 15/4251 (2013.01)

(58) Field of Classification Search
CPC ............ A47L 15/4246; A47L 15/4223; A47L 15/4251; F16L 3/26
See application file for complete search history.

(56) References Cited

U.S. PATENT DOCUMENTS

| 8,091,569 | B2 | 1/2012 | Jeong |
| 9,750,389 | B2 | 9/2017 | Busing et al. |
| D904,859 | S | 12/2020 | Mulvoy et al. |
| 11,882,978 | B2* | 1/2024 | Wolowicz ........... A47L 15/4223 |
| 2008/0072933 | A1 | 3/2008 | Graf et al. |
| 2009/0266385 | A1 | 10/2009 | Haltmayer et al. |
| 2009/0266427 | A1 | 10/2009 | Haltmayer et al. |
| 2009/0277481 | A1 | 11/2009 | Haltmayer et al. |
| 2010/0175183 | A1 | 7/2010 | Cannon et al. |
| 2010/0180643 | A1 | 7/2010 | Bolduan et al. |
| 2014/0263876 | A1 | 9/2014 | Haltmayer et al. |
| 2015/0115784 | A1 | 4/2015 | Busing et al. |
| 2020/0337519 | A1 | 10/2020 | Busing et al. |

FOREIGN PATENT DOCUMENTS

| CN | 111304882 A1 | 6/2020 |
| CN | 111560742 A1 | 8/2020 |
| DE | 2023299 A1 | 11/1971 |

(Continued)

Primary Examiner — Benjamin L Osterhout
(74) Attorney, Agent, or Firm — McGarry Bair PC (57) ABSTRACT A dishwasher for treating dishes according to a cycle of operation, the dishwasher comprising a chassis, a tub supported by the chassis and at least partially defining a treating chamber for receiving dishes, a structural element extending from the chassis along the tub and defining a socket; and a drain line extending between an inlet and an outlet and received in the socket.

20 Claims, 6 Drawing Sheets (56) References Cited

FOREIGN PATENT DOCUMENTS

| | | |
|---|---|---|
| EP | 1377706 B1 | 10/2005 |
| EP | 2886035 A1 | 6/2015 |
| EP | 3348703 B1 | 8/2019 |
| JP | H03170763 A | 7/1991 |
| JP | 2003210378 A | 7/2003 |

* cited by examiner

DISHWASHER WITH DRAIN ASSEMBLY

CROSS-REFERENCE TO RELATED APPLICATION(S)

This application claims priority to and is a continuation of U.S. patent application Ser. No. 17/493,952, filed Oct. 5, 2021, now U.S. Pat. No. 11,882,978, issued Jan. 30, 2024, the entirety of which is incorporated herein by reference in its entirety.

BACKGROUND

Contemporary automatic dish treating appliances for use in a typical household include a cabinet with an access opening and a tub that can have an open front and at least partially defines a treating chamber into which items, such as kitchenware, glassware, and the like, can be placed to undergo a treating operation, such as washing. At least one rack or basket, generally referred to as a dish rack, for supporting soiled dishes can be provided within the tub. A silverware or utensil basket for holding utensils, silverware, cutlery, and the like, may also be provided and is generally removably mounted to the door or within the dish rack.

Any one of the soiled dishes or utensils, silverware, cutlery, and the like, can be positioned for cleaning in the dish rack. In some cases when moving the dish rack in and out of the dishwasher, one of the soiled dishes or utensils, silverware, cutlery, and the like, can hit, become stuck by or otherwise interact with the sprayer making movement into the dishwasher difficult or cease for the dish rack. Inconveniently, users have to remove the dish rack, inspect the dish rack for the dish causing an interaction, reposition or remove the dish and attempt to move the dish rack back into the dishwasher.

BRIEF DESCRIPTION

The disclosure relates to a dishwasher for treating dishes according to a cycle of operation, the dishwasher comprising a dishwasher for treating dishes according to a cycle of operation, the dishwasher comprising a chassis, a tub supported by the chassis and at least partially defining a treating chamber for receiving dishes, a structural element extending from the chassis along the tub and defining a socket having a first portion, a second portion being located next to the first portion and extending parallel to the first portion along at least a portion of a length of the first portion and a drain line extending between an inlet and an outlet and received in the socket.

Another aspect of the disclosure relates to a drain assembly for a dishwasher comprising a structural element defining a socket and attachable to a frame of the dishwasher and wherein the socket includes a first portion and a second portion being located next to the first portion and extending parallel to the first portion along at least a portion of a length of the first portion and a drain line extending between an inlet and an outlet and received in the socket portion.

DETAILED DESCRIPTION

Figure 1:
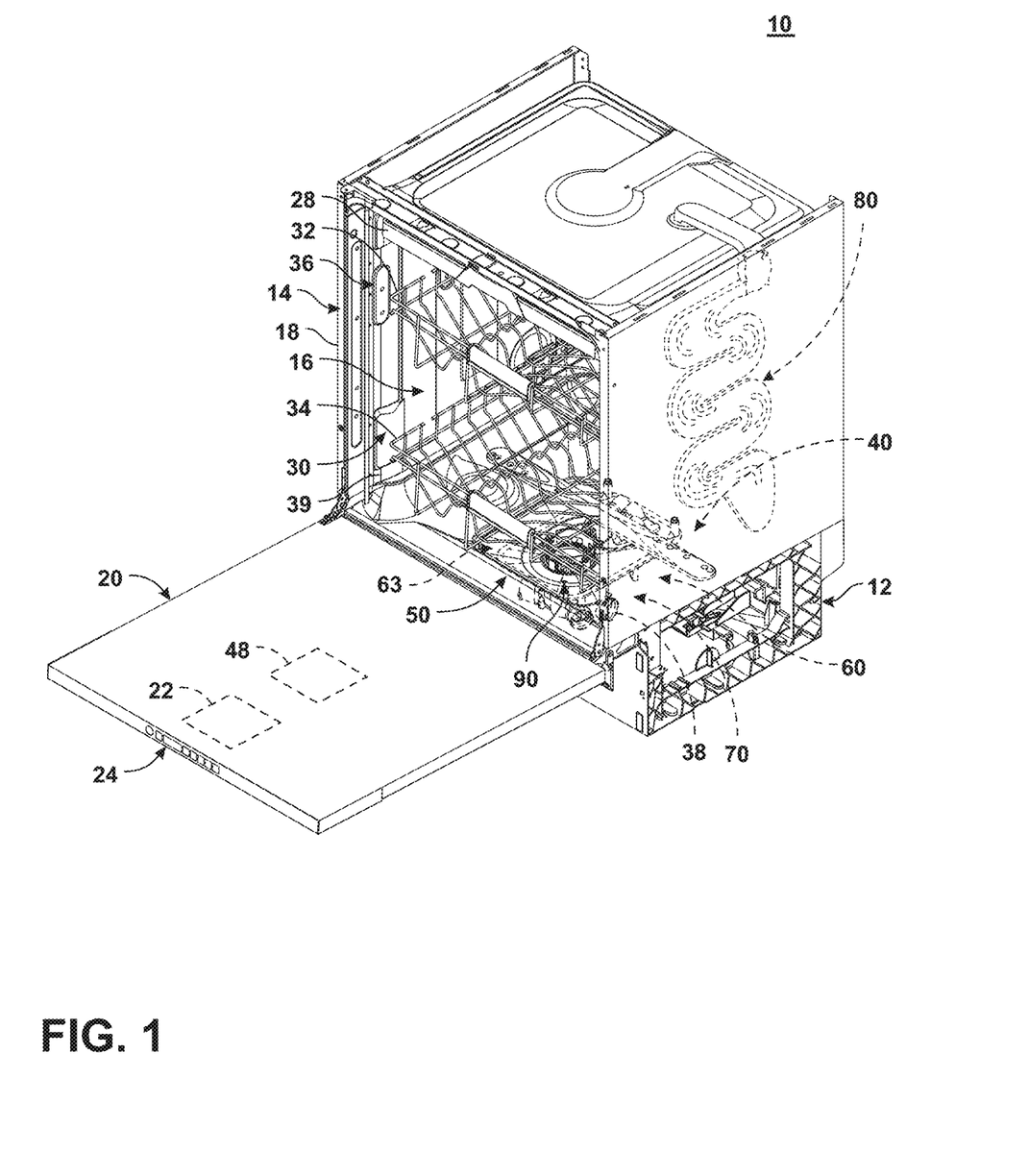
FIG. 1 is a right-side perspective view of an automatic dishwasher having multiple systems for implementing an automatic cycle of operation.

FIG. 1 illustrates an automatic dishwasher 10 capable of implementing an automatic cycle of operation to treat dishes. As used in this description, the term "dish(es)" is intended to be generic to any item, single or plural, that can be treated in the dishwasher 10, including, without limitation, dishes, plates, pots, bowls, pans, glassware, and silverware. As illustrated, the dishwasher 10 is a built-in dishwasher implementation, which is designed for mounting under a countertop. However, this description is applicable to other dishwasher implementations such as a stand-alone, drawer-type or a sink-type, for example.

The dishwasher 10 has a variety of systems, some of which are controllable, to implement the automatic cycle of operation. A chassis is provided to support the variety of systems needed to implement the automatic cycle of operation. As illustrated, for a built-in implementation, the chassis includes a frame in the form of a base 12 on which is supported an open-faced tub 14, which at least partially defines a treating chamber 16, having an open face 18, for receiving the dishes. A closure in the form of a door assembly 20 is pivotally mounted to the base 12 for movement between opened and closed positions to selectively open and close the open face 18 of the tub 14. Thus, the door assembly 20 provides selective accessibility to the treating chamber 16 for the loading and unloading of dishes or other items. While illustrated as a single panel, multiple parts can together define the door assembly 20.

The chassis, as in the case of the built-in dishwasher implementation, can be formed by other parts of the dishwasher 10, like the tub 14 and the door assembly 20, in addition to a dedicated frame structure, like the base 12, with them all collectively forming a uni-body frame to which the variety of systems are supported. In other implementations, like the drawer-type dishwasher, the chassis can be a tub that is slidable relative to a frame, with the closure being a part of the chassis or the countertop of the surrounding cabinetry. In a sink-type implementation, the sink forms the tub and the cover closing the open top of the sink forms the closure. Sink-type implementations are more commonly found in recreational vehicles.

Figure 2:
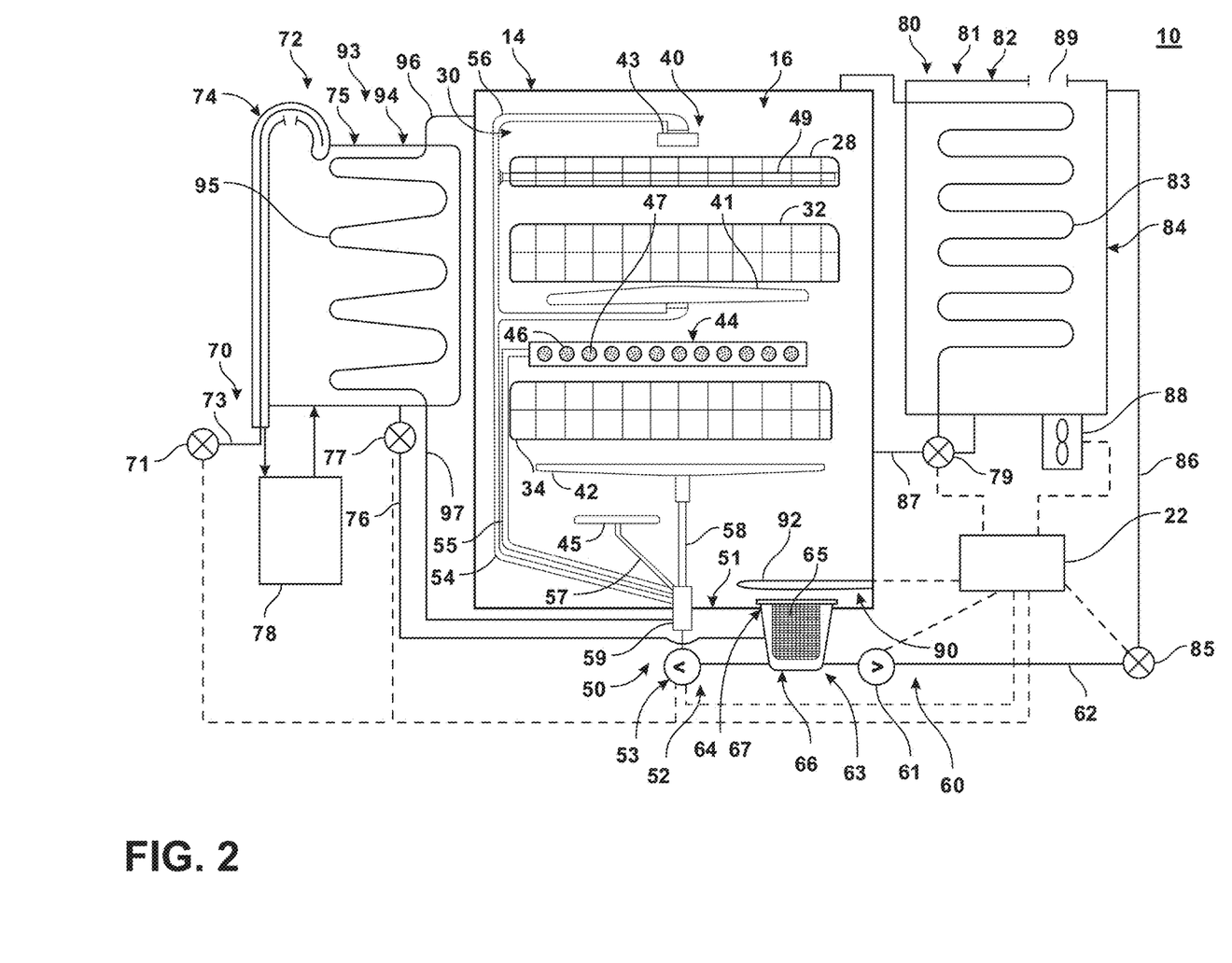
FIG. 2 is a schematic view of the dishwasher of FIG. 1 and illustrating at least some of the plumbing and electrical connections between at least some of systems.

The systems supported by the chassis, while essentially limitless, can include dish holding system 30, spray system 40, recirculation system 50, drain system 60, water supply system 70, drying system 80, heating system 90, and filter system 63. These systems are used to implement one or more treating cycles of operation for the dishes, for which there are many, and one of which includes a traditional automatic wash cycle.

A basic traditional automatic wash cycle of operation has a wash phase, where a detergent/water mixture is recirculated and then drained, which is then followed by a rinse phase where water alone or with a rinse agent is recirculated and then drained. An optional drying phase can follow the rinse phase. More commonly, the automatic wash cycle has multiple wash phases and multiple rinse phases. The multiple wash phases can include a pre-wash phase where water, with or without detergent, is sprayed or recirculated on the dishes, and can include a dwell or soaking phase. There can be more than one pre-wash phases. A wash phase, where water with detergent is recirculated on the dishes, follows the pre-wash phases. There can be more than one wash phase; the number of which can be sensor controlled based on the amount of sensed soils in the wash liquid. One or more rinse phases will follow the wash phase(s), and, in some cases, come between wash phases. The number of wash phases can also be sensor controlled based on the amount of sensed soils in the rinse liquid. The wash phases and rinse phases can include the heating of the water, even to the point of one or more of the phases being hot enough for long enough to sanitize the dishes. A drying phase can follow the rinse phase(s). The drying phase can include a drip dry, heated dry, condensing dry, air dry or any combination.

A controller 22 can also be included in the dishwasher 10 and operably couples with and controls the various components of the dishwasher 10 to implement the cycle of operation. The controller 22 can be located within the door assembly 20 as illustrated, or it can alternatively be located somewhere within the chassis. The controller 22 can also be operably coupled with a control panel or user interface 24 for receiving user-selected inputs and communicating information to the user. The user interface 24 can include operational controls such as dials, lights, switches, and displays enabling a user to input commands, such as a cycle of operation, to the controller 22 and receive information.

The dish holding system 30 can include any suitable structure for holding dishes within the treating chamber 16. Exemplary dish holders are illustrated in the form of upper dish racks 32 and lower dish rack 34, commonly referred to as "racks", which are located within the treating chamber 16. The upper dish racks 32 and the lower dish rack 34 are typically mounted for slidable movement in and out of the treating chamber 16 through the open face 18 for ease of loading and unloading. Drawer guides/slides/rails 36 are typically used to slidably mount the upper dish rack 32 to the tub 14. The lower dish rack 34 typically has wheels or rollers 38 that roll along rails 39 formed in sidewalls 168 of the tub 14 and onto the door assembly 20, when the door assembly 20 is in the opened position.

Dedicated dish holders can also be provided. One such dedicated dish holder is a third level rack 28 located above the upper dish rack 32. Like the upper dish rack 32, the third level rack is slidably mounted to the tub 14 with drawer guides/slides/rails 36. The third level rack 28 is typically used to hold utensils, such as tableware, spoons, knives, spatulas, etc., in an on-the-side or flat orientation. However, the third level rack 28 is not limited to holding utensils. If an item can fit in the third level rack, it can be washed in the third level rack 28. The third level rack 28 generally has a much shorter height or lower profile than the upper and lower dish racks 32, 34. Typically, the height of the third level rack is short enough that a typical glass cannot be stood vertically in the third level rack 28 and the third level rack 28 still slide into the treating chamber 16.

Another dedicated dish holder can be a silverware basket (not shown), which is typically carried by one of the upper or lower dish racks 32, 34 or mounted to the door assembly 20. The silverware basket typically holds utensils and the like in an upright orientation as compared to the on-the-side or flat orientation of the third level rack 28.

A dispenser assembly 48 is provided to dispense treating chemistry, e.g. detergent, anti-spotting agent, etc., into the treating chamber 16. The dispenser assembly 48 can be mounted on an inner surface of the door assembly 20, as shown, or can be located at other positions within the chassis. The dispenser assembly 48 can dispense one or more types of treating chemistries. The dispenser assembly 48 can be a single-use dispenser or a bulk dispenser, or a combination of both.

Turning to FIG. 2, the spray system 40 is provided for spraying liquid in the treating chamber 16 and can have multiple spray assemblies or sprayers, some of which can be dedicated to a particular one of the dish holders, to particular area of a dish holder, to a particular type of cleaning, or to a particular level of cleaning, etc. The sprayers can be fixed or movable, such as rotating, relative to the treating chamber 16 or dish holder. Six exemplary sprayers are illustrated and include, an upper spray arm 41, a lower spray arm 42, a third level sprayer 43, a deep-clean sprayer 44, and a spot sprayer 45. The upper spray arm 41 and lower spray arm 42 are rotating spray arms, located below the upper dish rack 32 and lower dish rack 34, respectively, and rotate about a generally centrally located and vertical axis. The third level sprayer 43 is located above the third level rack 28. The third level sprayer 43 is illustrated as being fixed, but could move, such as in rotating. In addition to the third level sprayer 43 or in place of the third level sprayer 43, a sprayer 49 can be located at least in part below a portion of the third level rack 28. The sprayer 49 is illustrated as a fixed tube, carried by the third level rack 28, but could move, such as in rotating about a longitudinal axis.

The deep-clean sprayer 44 is a manifold extending along a rear wall of the tub 14 and has multiple nozzles 46, with multiple apertures 47, generating an intensified and/or higher pressure spray than the upper spray arm 41, the lower spray arm 42, or the third level sprayer 43. The nozzles 46 can be fixed or move, such as in rotating. The spray emitted by the deep-clean sprayer 44 defines a deep clean zone, which, as illustrated, would like along a rear side of the lower dish rack 34. Thus, dishes needing deep cleaning, such as dishes with baked-on food, can be located in the lower dish rack 34 to face the deep-clean sprayer 44. The deep-clean sprayer 44, while illustrated as only one unit on a rear wall of the tub 14 could comprises multiple units and/or extend along multiple portions, including different walls, of the tub 14, and can be provide above, below or beside any of the dish holders with deep-cleaning is desired.

The spot sprayer 45, like the deep-clean sprayer, can emit an intensified and/or higher-pressure spray, especially to a discrete location within one of the dish holders. While the spot sprayer 45 is shown below the lower dish rack 34, it could be adjacent any part of any dish holder or along any wall of the tub where special cleaning is desired. In the illustrated location below the lower dish rack 34, the spot sprayer can be used independently of or in combination with the lower spray arm 42. The spot sprayer 45 can be fixed or can move, such as in rotating.

These six sprayers are illustrative examples of suitable sprayers and are not meant to be limiting as to the type of suitable sprayers.

The recirculation system 50 recirculates the liquid sprayed into the treating chamber 16 by the sprayers of the spray system 40 back to the sprayers to form a recirculation loop or circuit by which liquid can be repeatedly and/or continuously sprayed onto dishes in the dish holders. The recirculation system 50 can include a sump 51 and a pump assembly 52. The sump 51 collects the liquid sprayed in the treating chamber 16 and can be formed by a sloped or recess portion of a bottom wall of the tub 14. The pump assembly 52 can include one or more pumps such as recirculation pump 53. The sump 51 can also be a separate module that is affixed to the bottom wall and include the pump assembly 52.

Multiple supply conduits 54, 55, 56, 57, 58 fluidly couple the sprayers 43, 44, 45, 49 to the recirculation pump 53. A recirculation valve 59 can selectively fluidly couple each of the conduits 54-58 to the recirculation pump 53. While each sprayer 43, 44, 45, 49 is illustrated as having a corresponding dedicated supply conduit 54-58 one or more subsets, comprising multiple sprayers from the total group of sprayers 43, 44, 45, 49, can be supplied by the same conduit, negating the need for a dedicated conduit for each sprayer. For example, a single conduit can supply the upper spray arm 41 and the third level sprayer 43. Another example is that the sprayer 49 is supplied liquid by the conduit 56, which also supplies the third level sprayer 43.

The recirculation valve 59, while illustrated as a single valve, can be implemented with multiple valves. Additionally, one or more of the conduits can be directly coupled to the recirculation pump 53, while one or more of the other conduits can be selectively coupled to the recirculation pump with one or more valves. There are essentially an unlimited number of plumbing schemes to connect the recirculation system 50 to the spray system 40. The illustrated plumbing is not limiting.

A drain system 60 drains liquid from the treating chamber 16. The drain system 60 can include a drain pump 61 fluidly coupling the treating chamber 16 to a drain line 62. As illustrated the drain pump 61 can fluidly couple the sump 51 to the drain line 62.

While separate recirculation and drain pumps 53 and 62 are illustrated, a single pump can be used to perform both the recirculating and the draining functions. Alternatively, the drain pump 61 can be used to recirculate liquid in combination with the recirculation pump 53. When both a recirculation pump 53 and drain pump 61 are used, the drain pump 61 is typically more robust than the recirculation pump 53 as the drain pump 61 tends to have to remove solids and soils from the sump 51, unlike the recirculation pump 53, which tends to recirculate liquid which has solids and soils filtered away to some extent.

A water supply system 70 is provided for supplying fresh water to the dishwasher 10 from a household water supply via a household water valve 71. The water supply system 70 includes a water supply unit 72 having a water supply conduit 73 with a siphon break 74. While the water supply conduit 73 can be directly fluidly coupled to the tub 14 or any other portion of the dishwasher 10, the water supply conduit is shown fluidly coupled to a supply tank 75, which can store the supplied water prior to use. The supply tank 75 is fluidly coupled to the sump 51 by a supply line 76, which can include a controllable valve 77 to control when water is released from the supply tank 75 to the sump 51.

The supply tank 75 can be conveniently sized to store a predetermined volume of water, such as a volume required for a phase of the cycle of operation, which is commonly referred to as a "charge" of water. The storing of the water in the supply tank 75 prior to use is beneficial in that the water in the supply tank 75 can be "treated" in some manner, such as softening or heating prior to use.

A water softener 78 is provided with the water supply system 70 to soften the fresh water. The water softener 78 is shown fluidly coupling the water supply conduit 73 to the supply tank 75 so that the supplied water automatically passes through the water softener 78 on the way to the supply tank 75. However, the water softener 78 could directly supply the water to any other part of the dishwasher 10 than the supply tank 75, including directly supplying the tub 14. Alternatively, the water softener 78 can be fluidly coupled downstream of the supply tank 75, such as in-line with the supply line 76. Wherever the water softener 78 is fluidly coupled, it can be done so with controllable valves, such that the use of the water softener 78 is controllable and not mandatory.

A drying system 80 is provided to aid in the drying of the dishes during the drying phase. The drying system as illustrated includes a condensing assembly 81 having a condenser 82 formed of a serpentine conduit 83 with an inlet fluidly coupled to an upper portion of the tub 14 and an outlet fluidly coupled to a lower portion of the tub 14, whereby moisture laden air within the tub 14 is drawn from the upper portion of the tub 14, passed through the serpentine conduit 83, where liquid condenses out of the moisture laden air and is returned to the treating chamber 16 where it ultimately evaporates or is drained via the drain pump 61. The serpentine conduit 83 can be operated in an open loop configuration, where the air is exhausted to atmosphere, a closed loop configuration, where the air is returned to the treating chamber, or a combination of both by operating in one configuration and then the other configuration.

To enhance the rate of condensation, the temperature difference between the exterior of the serpentine conduit 83 and the moisture laden air can be increased by cooling the exterior of the serpentine conduit 83 or the surrounding air. To accomplish this, an optional cooling tank 84 is added to the condensing assembly 81, with the serpentine conduit 83 being located within the cooling tank 84. The cooling tank 84 is fluidly coupled to at least one of the spray system 40, recirculation system 50, drain system 60 or water supply system 70 such that liquid can be supplied to the cooling tank 84. The liquid provided to the cooling tank 84 from any of the systems 40-70 can be selected by source and/or by phase of cycle of operation such that the liquid is at a lower temperature than the moisture laden air or even lower than the ambient air.

As illustrated, the liquid is supplied to the cooling tank 84 by the drain system 60. A valve 85 fluidly connects the drain line 62 to a supply conduit 86 fluidly coupled to the cooling tank 84. A return conduit 87 fluidly connects the cooling tank 84 back to the treating chamber 16 via a return valve 79. In this way a fluid circuit is formed by the drain pump 61, drain line 62, valve 85, supply conduit 86, cooling tank 84, return valve 79 and return conduit 87 through which liquid can be supplied from the treating chamber 16, to the cooling tank 84, and back to the treating chamber 16. Alternatively, the supply conduit 86 could fluidly couple to the drain line 62 if re-use of the water is not desired.

To supply cold water from the household water supply via the household water valve 71 to the cooling tank 84, the water supply system 70 would first supply cold water to the treating chamber 16, then the drain system 60 would supply the cold water in the treating chamber 16 to the cooling tank 84. It should be noted that the supply tank 75 and cooling tank 84 could be configured such that one tank performs both functions.

The drying system 80 can use ambient air, instead of cold water, to cool the exterior of the serpentine conduit 83. In such a configuration, a blower 88 is connected to the cooling tank 84 and can supply ambient air to the interior of the cooling tank 84. The cooling tank 84 can have a vented top 89 to permit the passing through of the ambient air to allow for a steady flow of ambient air blowing over the serpentine conduit 83.

The cooling air from the blower 88 can be used in lieu of the cold water or in combination with the cold water. The cooling air will be used when the cooling tank 84 is not filled with liquid. Advantageously, the use of cooling air or cooling water, or combination of both, can be selected on the site-specific environmental conditions. If ambient air is cooler than the cold water temperature, then the ambient air can be used. If the cold water is cooler than the ambient air, then the cold water can be used. Cost-effectiveness can also be considered when selecting between cooling air and cooling water. The blower 88 can be used to dry the interior of the cooling tank 84 after the water has been drained. Suitable temperature sensors for the cold water and the ambient air can be provided and send their temperature signals to the controller 22, which can determine which of the two is colder at any time or phase of the cycle of operation.

A heating system 90 is provided for heating water used in the cycle of operation. The heating system 90 includes a heater 92, such as an immersion heater, located in the treating chamber 16 at a location where it will be immersed by the water supplied to the treating chamber 16. The heater 92 need not be an immersion heater, it can also be an in-line heater located in any of the conduits. There can also be more than one heater 92, including both an immersion heater and an in-line heater.

The heating system 90 can also include a heating circuit 93, which includes a heat exchanger 94, illustrated as a serpentine conduit 95, located within the supply tank 75, with a supply conduit 96 supplying liquid from the treating chamber 16 to the serpentine conduit 95, and a return conduit 97 fluidly coupled to the treating chamber 16. The heating circuit 93 is fluidly coupled to the recirculation pump 53 either directly or via the recirculation valve 59 such that liquid that is heated as part of a cycle of operation can be recirculated through the heat exchanger 94 to transfer the heat to the charge of fresh water residing in the supply tank 75. As most wash phases use liquid that is heated by the heater 92, this heated liquid can then be recirculated through the heating circuit 93 to transfer the heat to the charge of water in the supply tank 75, which is typically used in the next phase of the cycle of operation.

A filter system 63 is provided to filter un-dissolved solids from the liquid in the treating chamber 16. The filter system 63 includes a coarse filter 64 and a fine filter 65, which can be a removable basket 66 residing the sump 51, with the coarse filter 64 being a screen 67 circumscribing the removable basket 66. Additionally, the recirculation system 50 can include a rotating filter in addition to or in place of the either or both of the coarse filter 64 and fine filter 65. Other filter arrangements are contemplated such as an ultrafiltration system.

Figure 3:
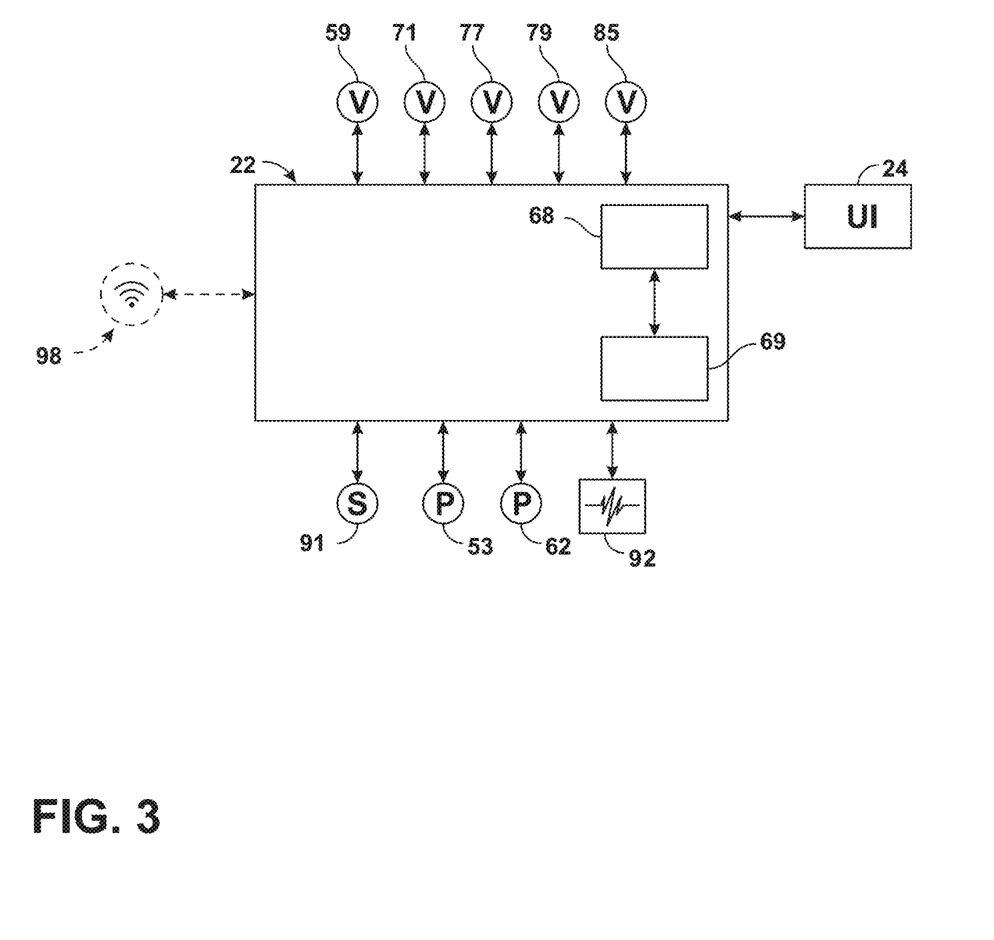
FIG. 3 is a schematic view of a controller of the dishwasher of FIGS. 1 and 2.

As illustrated schematically in FIG. 3, the controller 22 can be coupled with the heater 92 for heating the wash liquid during a cycle of operation, the drain pump 61 for draining liquid from the treating chamber 16, and the recirculation pump 53 for recirculating the wash liquid during the cycle of operation. The controller 22 can be provided with a memory 68 and a central processing unit (CPU) 69. The memory 68 can be used for storing control software that can be executed by the CPU 69 in completing a cycle of operation using the dishwasher 10 and any additional software. For example, the memory 68 can store one or more pre-programmed automatic cycles of operation that can be selected by a user and executed by the dishwasher 10. The controller 22 can also receive input from one or more sensors 91. Non-limiting examples of sensors that can be communicably coupled with the controller 22 include, to name a few, ambient air temperature sensor, treating chamber temperature sensor, water supply temperature sensor, door open/close sensor, and turbidity sensor to determine the soil load associated with a selected grouping of dishes, such as the dishes associated with a particular area of the treating chamber. The controller 22 can also communicate with the recirculation valve 59, the household water valve 71, the controllable valve 77, the return valve 79, and the valve 85. Optionally, the controller 22 can include or communicate with a wireless communication device 98.

Figure 4:
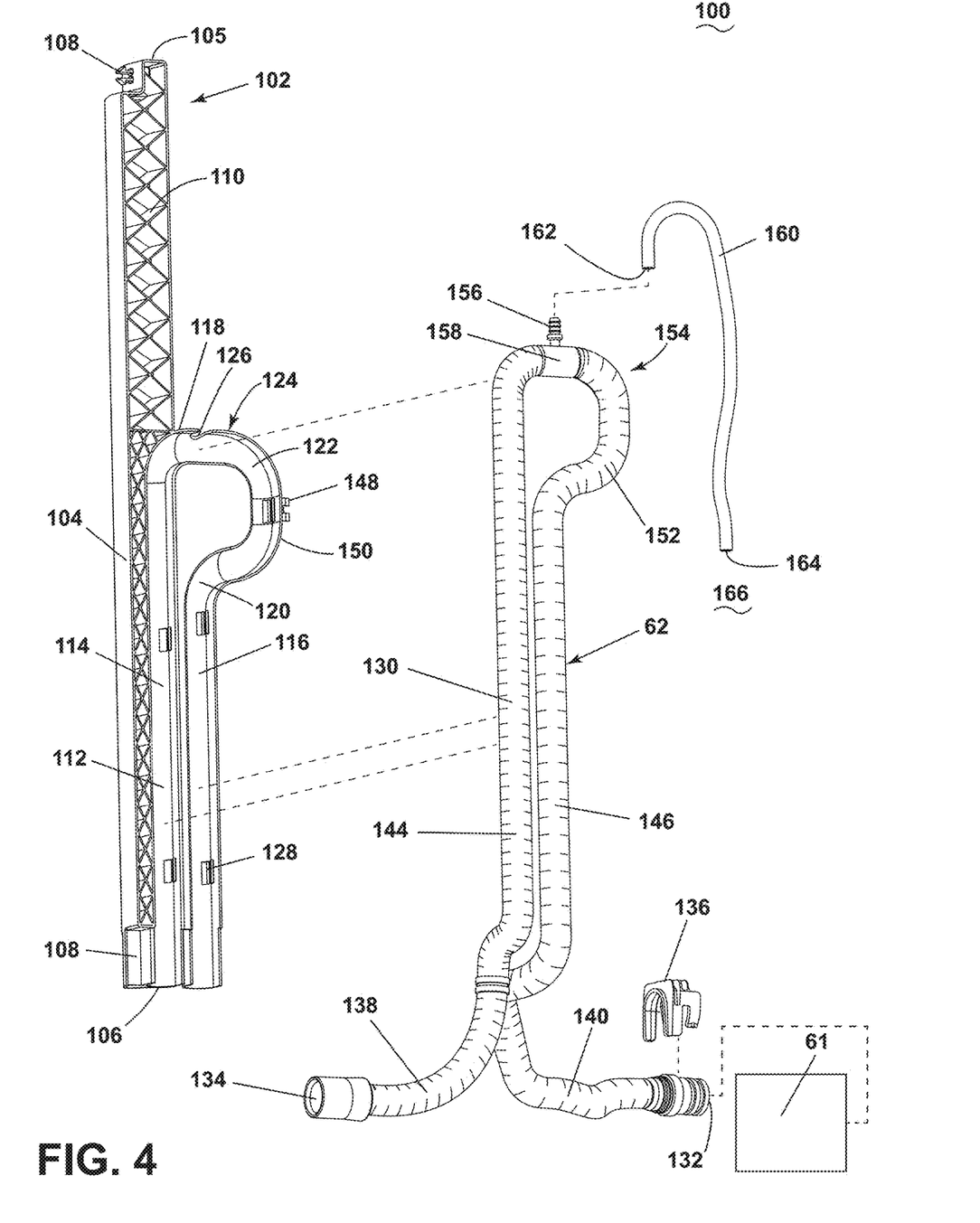
FIG. 4 is an exploded view of a drain assembly for the dishwasher of FIG. 1 according to an aspect of the disclosure herein.

Turning to FIG. 4 an exploded view of a drain assembly 100 for the drain system 60 of the dishwasher 10 according to an aspect of the disclosure herein is illustrated. The drain assembly 100 can include a structural element 102, the drain line 62, and the drain pump 61. The structural element 102 can include a column 104 extending in a vertical direction between a top 105 and a bottom 106. The column 104 can terminate in mounting fixtures 108 at one or both of the top 105 and bottom 106. The column 104 can be formed with a grid structure 110 for rigidity.

The structural element 102 can further include a socket 112. The socket 112 can include a first vertical portion 114 extending from the bottom 106 at least partially along the column 104. A second vertical portion 116 can be located next to the first vertical portion 114. The second vertical portion 116 can extend parallel to the first vertical portion 114 from the bottom 106 at least partially along the first vertical portion 114. In other words, the top 105 of the column 104 can be located at a higher elevation than a top 118 of the first vertical portion 114 which in turn can be at a higher elevation than a top 120 of the second vertical portion 116.

The socket 112 can further include a top portion 122. The top portion 122 can connect the top 118 of the first vertical portions 114 to the top 120 of the second vertical portion 116 to define a loop 124 of the socket 112. The first and second vertical portions 114, 116 together with the top portion 122 can define a P-shape, where a top of the "P" is the same top as the top 118 of the first vertical portion 114. A cut-out 126 can be located at the top 118 of the "P". The socket 112 can further include at least one tab, illustrated as multiple tabs 128. A clamp 148 can be coupled to the socket 112 at an outer portion 150 of the loop 124.

A drain hose 130 can define at least a portion of the drain line 62. The drain hose 130 can extend between an inlet 132 and an outlet 134. The drain hose 130 can include a first vertical portion 144 fluidly couple to the outlet 134 and a second vertical portion 146 fluidly coupled to the inlet 132. The second vertical portion 146 can extend parallel to the first vertical portion 144. The drain hose 130 can further include a top portion 152. The top portion 152 can fluidly couple the first vertical portion 144 to the second vertical portion 146 to define a loop 154 of the drain hose 130. The first and second vertical portions 144, 146 together with the top portion 152 can define a P-shape slightly smaller than the P-shape of the socket 112.

At least one hose extension 138 can fluidly couple the first vertical portion 144 to the outlet 134. Another at least one hose extension 140 can fluidly couple the second vertical portion 146 to the inlet 132. It should be understood that any number of hose extensions 138, 140 can be utilized depending on the location of surrounding elements, by way of non-limiting example the sump 51 of the dishwasher 10.

A check valve 156 can be fluidly coupled to the drain hose 130 at a top 158 of the loop 154 of the drain hose 130. An air hose 160 can extend between a check inlet 162 and an ambient outlet 164 open to ambient air 166. An outlet attachment 136 can be coupled to the outlet 134.

Figure 5:
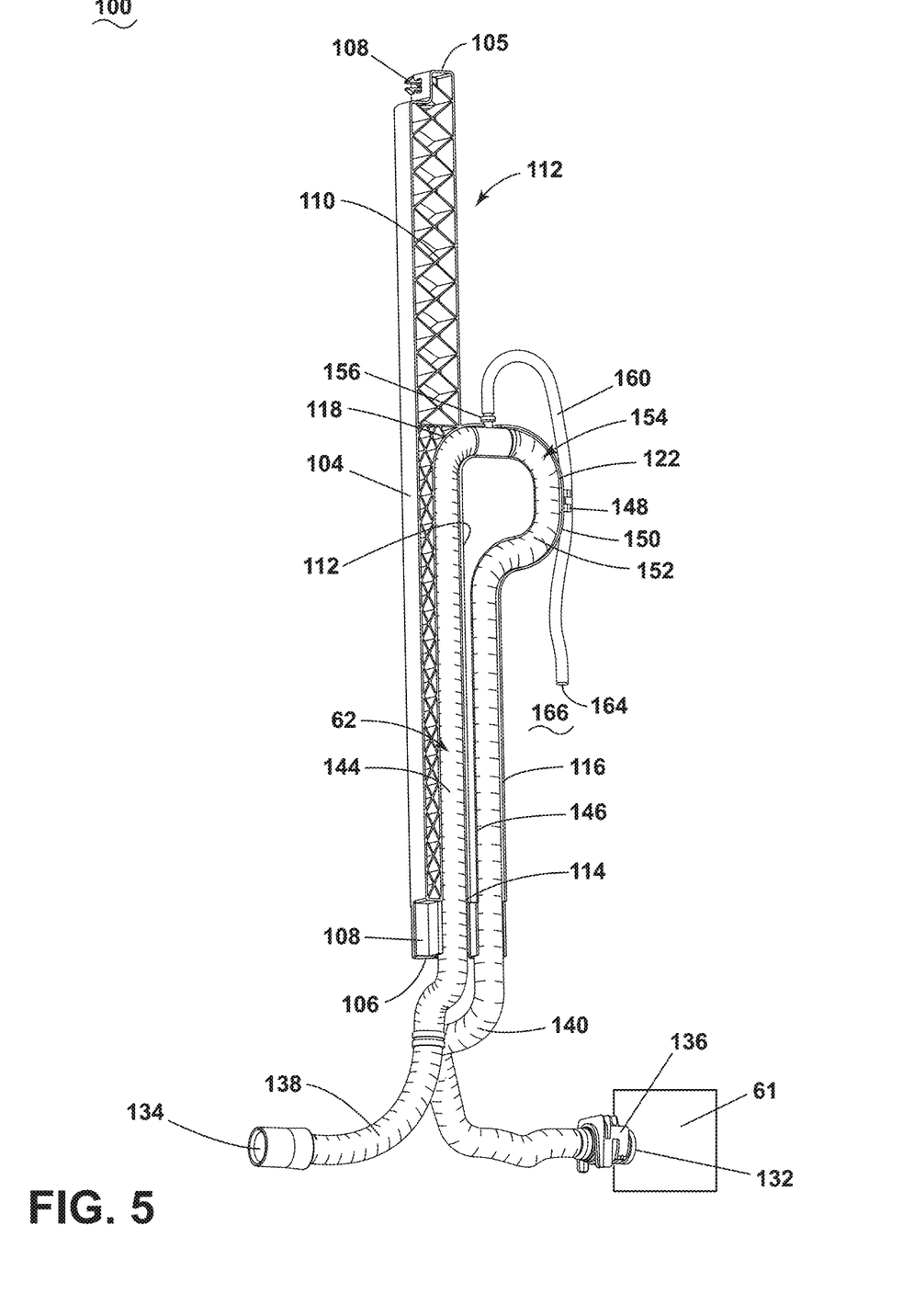
FIG. 5 is an assembled view of the drain assembly of FIG. 4.

Turning to FIG. 5, an assembled perspective view of the drain assembly 100 is illustrated. At least a portion of the drain hose 130 can be shaped to be received in the socket 112. More specifically the first vertical portion 144 of the drain hose 130 is received in the first vertical portion 114 of the socket 112, the second vertical portion 146 of the drain hose 130 is received in the second vertical portion 116 of the socket 112, and the top portion 152 of the drain hose 130 is received in the top portion 122 of the socket 112. In one aspect of the disclosure, these portions 144, 146, 152 of the drain hose 130 are snap-fit into the socket 112. The multiple tabs 128 can hold these portions 144, 146, 152 of the drain hose 130 in place. Furthermore, when assembled the check-valve 156 can be received in the cut-out 126 of the socket 112. The check inlet 162 can be fluidly coupled to the check-valve 156. The air hose 160 can be held in place by the clamp 148 along the outer portion 150 of the loop 124. The outlet attachment can fluidly couple the outlet 134 to the drain pump 61.

The loop 154 of the drain hose 130 enables a maximum level of water inside the drain hose. The shape of the loop 154 enables a smooth redirecting of the drained water from upward to downward. Further the loop 154 provides a fixation spot for the check valve 156.

The structural element 102 can be 3D printed, or injection molded such that the structural element 102 is a single monolithic piece including the socket 112 and the column 104. The structural element 102 can be formed as a modular piece in order to mount to a variety of bases 12 in different dishwashers 10.

Figure 6:
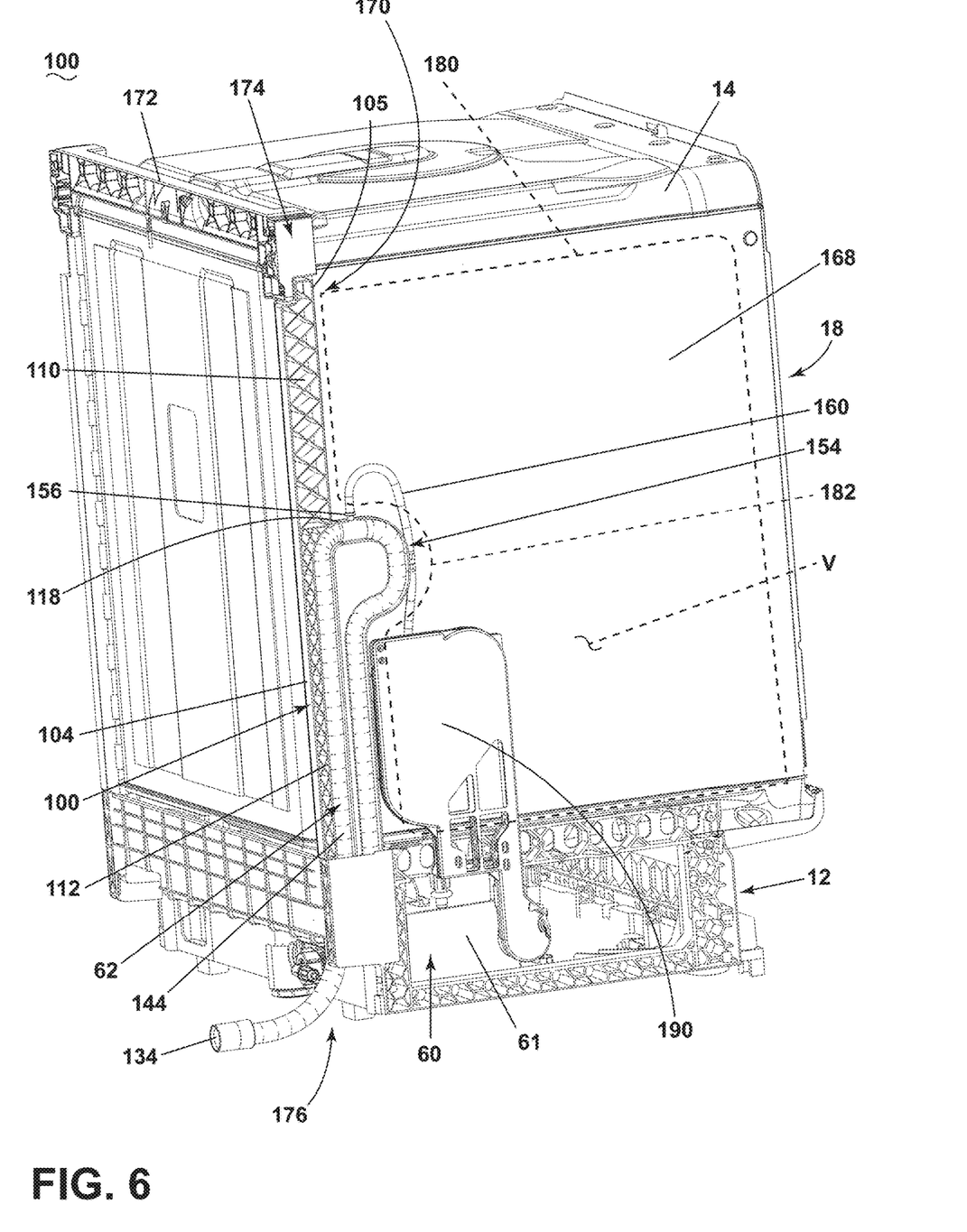
FIG. 6 is a perspective view of a rear of the dishwasher of FIG. 1 with the drain assembly of FIG. 5 in place.

Turning to FIG. 6, a perspective view of the dishwasher 10 of FIG. 1 with the drain assembly 100 in place is illustrated. The drain assembly 100 can be mounted to the frame 12 at a rear corner 170 of the dishwasher 10. The column 104 can extend vertically along the tub 14. The structural element 102 can be mounted to a top frame 172 at the top 105 to define a top left corner 174. The mounting fixtures 108 at the bottom 106 of the structural element 102 can be received by the base 12 proximate a bottom left corner 176 of the dishwasher 10. In this manner the structural element 102 not only includes the column 104 and the socket 112, but can also define the rear corner 170 of the chassis for the dishwasher 10.

Placement of the drain assembly 100 at the rear corner 170 of the dishwasher 10 can maximize space remaining for placement of a water tank 180. The water tank 180 can have an indent 182 shaped to fit the loop 124 of the structural element 102 within. Forming the water tank 180 with the indent 182 enables a maximum volume (V) of the water tank 180.

Furthermore, placement of the drain assembly 100 at the rear corner 170 can minimize a length of the drain hose 130 required. Typically, an additional bend in the drain hose the exists within the dishwasher. By directly connecting the inlet 132 and outlet 134 to the bottom 106 at the bottom left corner 176 any additional unnecessary bends in the drain hose 130 are eliminated.

The P-shape of the socket 112 can also accommodate an air gap break component 190 positioned below the loop 110 and proximate the column 104 as part of the drain assembly 100. It should be understood that while illustrated as a P-shape, the loops 124, 154 and indent 182 described herein can have any congruent shapes for maximizing volume and minimizing the length of the drain hose 130.

Benefits associated with the disclosure described herein include decreasing cost by decreasing parts necessary for mounting and placement of a drain assembly. The compact geometry of the drain assembly minimizes the drain hose length. Further, integrating the structural element with the frame of the dishwasher at a rear corner, maximizes the space left on the side of the dishwasher for a water tank, in turn maximizing a water tank volume.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure. Moreover, while "a set of" various elements have been described, it will be understood that "a set" can include any number of the respective elements, including only one element.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A dishwasher for treating dishes according to a cycle of operation, the dishwasher comprising:
   a chassis;
   a tub supported by the chassis and at least partially defining a treating chamber for receiving the dishes;
   a structural element extending from the chassis along the tub and defining a socket, the structural element including a column extending in a vertical direction between a top and a bottom, and wherein the socket includes a first vertical portion extending from the bottom at least partially along the column, a second vertical portion being located next to the first vertical portion and extending parallel to the first vertical portion from the bottom at least partially along the first vertical portion; and
   a drain line extending between an inlet and an outlet and received in the socket.

2. The dishwasher of claim 1, wherein the socket further comprises a top portion connecting an upper portion of the first vertical portion to an upper portion of the second vertical portion.

3. The dishwasher of claim 2, wherein the top portion further comprises a cut-out.

4. The dishwasher of claim 3, wherein the drain line further comprises a check valve located at the cut-out.

5. The dishwasher of claim 4, further comprising an air hose fluidly coupled to the check valve and open to ambient air.

6. The dishwasher of claim 2, wherein the first vertical portion and the second vertical portion together with the top portion define a P-shaped socket.

7. The dishwasher of claim 6, further comprising a water tank formed to fit with the P-shaped socket along a sidewall of the tub.

8. The dishwasher of claim 2, further comprising an air gap break component and the top portion is located at a higher elevation than the air gap break component.

9. The dishwasher of claim 1, wherein the top of the column is located higher than a top of the first vertical portion, which is higher than a top of the second vertical portion.

10. The dishwasher of claim 1, wherein the socket further comprises tabs for holding the drain line in place.

11. The dishwasher of claim 10, wherein the drain line is snap-fit into the socket.

12. The dishwasher of claim 1, wherein the structural element is injection molded plastic.

13. A drain assembly for a dishwasher comprising:
   a structural element defining a socket and attachable to a frame of the dishwasher and wherein the socket includes a first portion and a second portion being located next to the first portion and extending parallel to the first portion along at least a portion of a length of the first portion; and
   a drain line extending between an inlet and an outlet and received in the socket.

14. The drain assembly of claim 13, wherein the socket further comprises a top portion connecting the first portion to the second portion.

15. The drain assembly of claim 14, wherein the top portion further comprises a vent opening.

16. The drain assembly of claim 15, wherein the drain line further comprises a check valve located at the vent opening.

17. The drain assembly of claim 16, further comprising an air hose fluidly coupled to the check valve and open to ambient air.

18. The drain assembly of claim 13, wherein the drain line is snap-fit into the socket.

19. The drain assembly of claim 13, wherein the structural element is injection molded plastic.

20. A dishwasher for treating dishes according to a cycle of operation, the dishwasher comprising:
   a chassis;
   a tub supported by the chassis and at least partially defining a treating chamber for receiving the dishes;
   a structural element extending from the chassis along the tub and defining a socket having a first portion, a second portion being located next to the first portion and extending parallel to the first portion along at least a portion of a length of the first portion; and
   a drain line extending between an inlet and an outlet and received in the socket.

* * * * *